May 11, 1965 A. W. SERIO 3,182,584
BEVERAGE BREWING APPARATUS
Filed Dec. 12, 1962 4 Sheets-Sheet 1
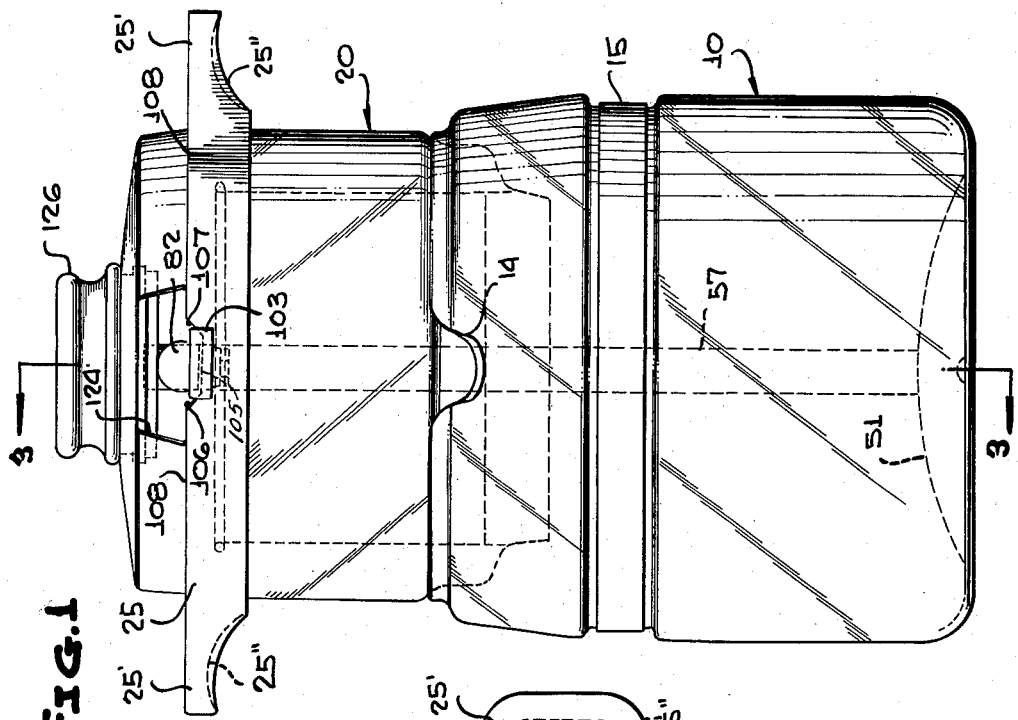
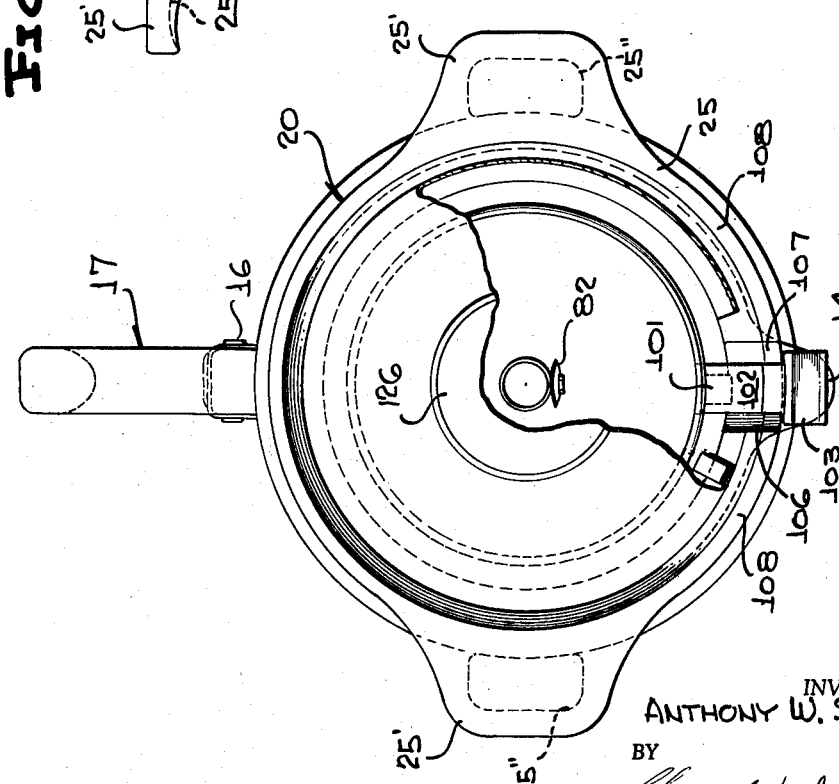
INVENTOR.
ANTHONY W. SERIO
BY
Shoemaker and Mattare
ATTORNEYS

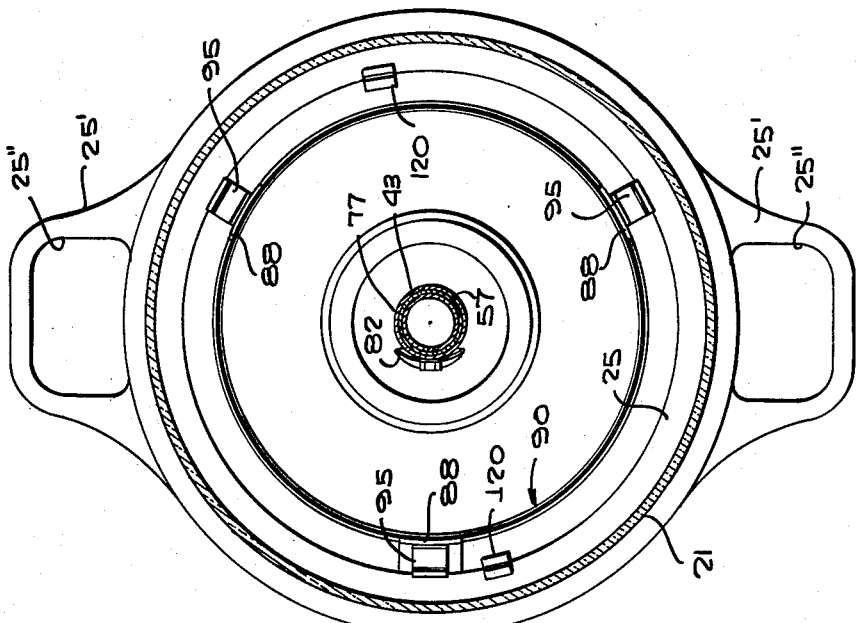
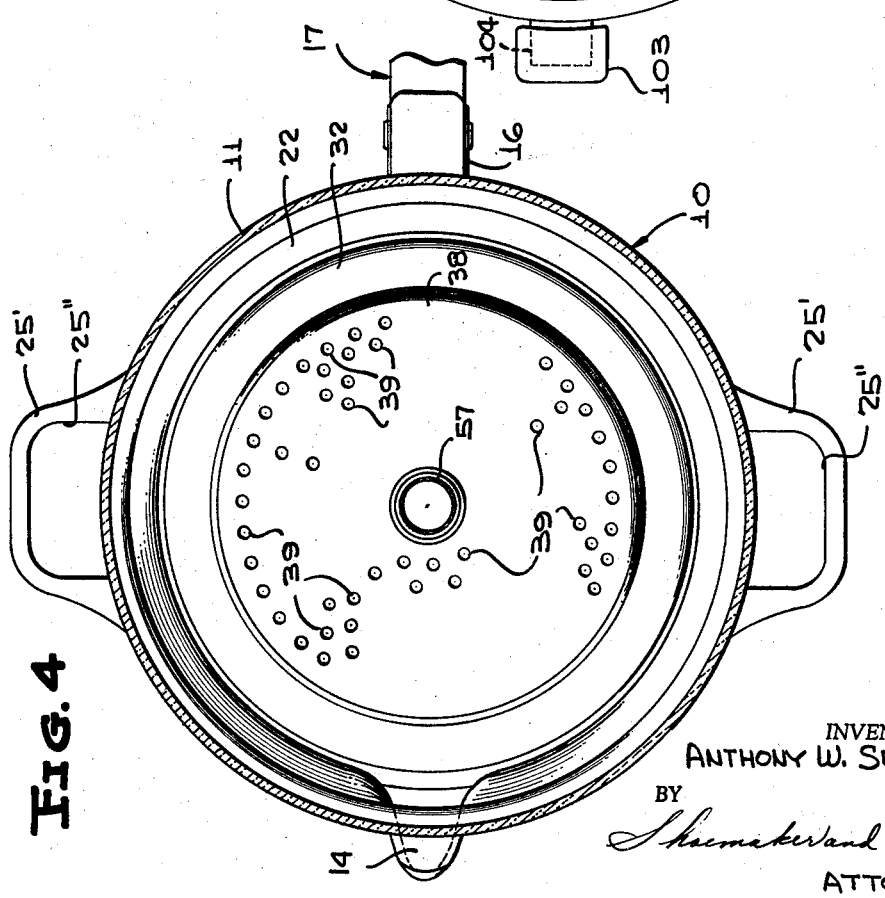

May 11, 1965      A. W. SERIO      3,182,584
BEVERAGE BREWING APPARATUS
Filed Dec. 12, 1962      4 Sheets-Sheet 4
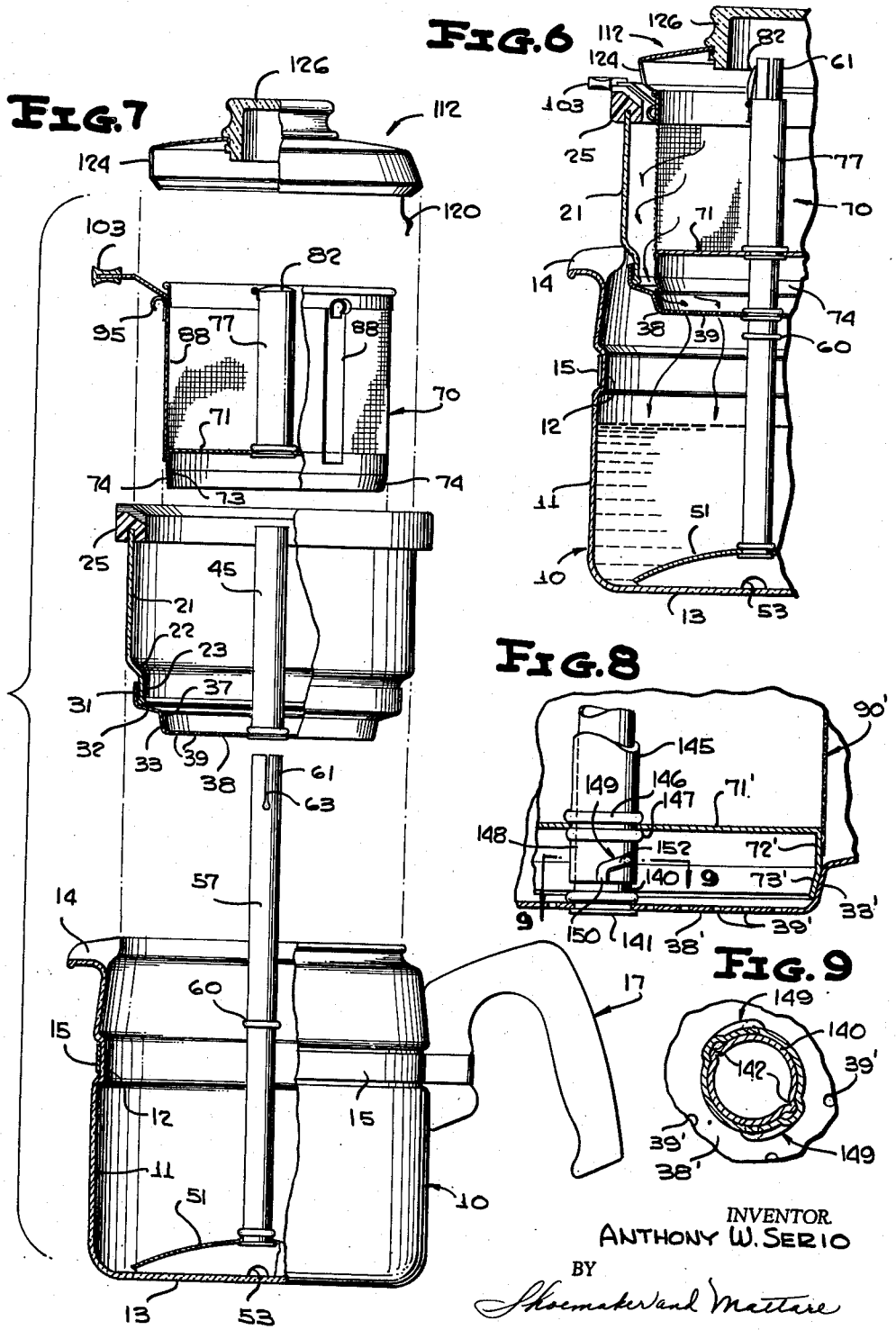
INVENTOR.
ANTHONY W. SERIO
BY
Shoemaker and Mattare
ATTORNEYS United States Patent Office 3,182,584
Patented May 11, 1965

3,182,584
BEVERAGE BREWING APPARATUS
Anthony W. Serio, Elmira, N.Y., assignor to Youngstown Steel Door Company, Cleveland, Ohio, a corporation of Ohio
Filed Dec. 12, 1962, Ser. No. 244,149
18 Claims. (Cl. 99—284)

The present invention relates to new and novel beverage brewing apparatus, and more particularly to apparatus which is adapted to brew coffee, tea, and similar beverages particularly where it is desirable to steep the coffee grounds, tea leaves, or the like.

The apparatus of the present invention is especially designed to provide maximum versatility wherein it may be utilized equally well for brewing coffee, tea or other types of beverages, the structure including a plurality of containers which are adapted to be disposed in operative relationship relative to one another and easily and readily removable to serve different functions.

The lower container means of the present invention is suitable for use as a server or tea pot and provides a neat and attractive appearance which is an important sales point. The various components of the apparatus are provided with heat insulated portions so that the various components can be readily handled without the danger of burning one's hands. A feature of the present invention is that the contents of the lower container may be poured out of the lower container without removing the top container portions and the arrangement is such that coffee grounds or the like are prevented from being entrained in the liquid stream as it is poured from the lower container.

A particularly important feature of the present invention is the arrangement whereby the flow of liquid from the upper container to the lower container may be controlled. In the present invention, the upper container has a perforated lower wall portion and a third container is disposed within the second container. The lower portions of the second and third containers are provided with interengageable sealing means whereby the flow of liquid from the second container down into the first container may be prevented. The second container is also adapted to retain coffee grounds or the like therein while allowing liquid to escape through a perforated side wall portion thereof. With this arrangement according to the present invention, the amount of time during which the coffee grounds, tea leaves or the like are allowed to steep within the liquid may be readily controlled, thereby providing the ultimate in obtaining the desired flavor and taste.

Means is provided whereby this seal between the second and third container means may be readily disengaged as desired to allow the liquid to flow downwardly into the lower container when the desired steeping time has been obtained.

While the sealing surfaces of the second and third containers are generally sufficient to ensure a liquid tight seal, auxiliary means which is shown as taking two different forms in the present invention are provided for positively ensuring that an effective liquid seal will be obtained at all times between the second and third containers.

A further important feature of the present invention is the fact that the apparatus may be utilized in brewing coffee either as a drip type apparatus or as a percolating type apparatus. This, of course, is very desirable since the single apparatus according to the present invention may be utilized for any type of brewing operation. In addition, the arrangement is such that even the finest grounds of coffee for example will be retained in place within the third container means which is adapted to hold the coffee grounds, tea leaves, and the like.

When brewing coffee with the apparatus of the present invention, a number of advantages are provided. In particular, the controlled steeping time will result in better taste characteristics, and additionally will serve to save on the amount of coffee employed thereby providing an economical benefit. Less coffee may be utilized with the apparatus of the present invention due to the fact that the liquid may be allowed to surround the coffee grounds and the coffee grounds can steep in the liquid for a controlled amount of time. All of the advantages as set forth above are obtained with a structure which is relatively simple and inexpensive in construction, and yet which at the same time is very sturdy and efficient in use.

An object of the present invention is to provide new and novel beverage brewing apparatus including a plurality of containers and wherein the lower container means may be utilized as a server or teapot having a neat and attractive appearance, and further wherein all of the various components which are normally handled manually are provided with heat insulated portions to eliminate the possibility of burning one's hands.

Another object of the invention is the provision of beverage brewing apparatus which can be used equally well for brewing coffee, tea, or other similar beverages and which permits the contents of the lower container to be poured without removing the top container and prevents coffee grounds or the like from being entrained in the outwardly flowing liquid stream.

A further object of the present invention is to provide beverage brewing apparatus including means for controlling the flow of liquid from the second container into the first container to thereby control the amount of steeping time and to further retain the elements in positive sealing engagement so as to ensure that there will be no leakage of liquid from the second container to the first container.

A still further object of the present invention is to provide beverage brewing apparatus which is particularly useful for brewing coffee and which can be utilized for brewing coffee according to either the drip style or percolating style of coffee making and wherein the device is adapted to be utilized with the finest grounds encountered in conventional coffee making and these grounds will be positively prevented from flowing down into the first container from which the brewed beverage is eventually dispensed.

A still further object of the invention is to provide beverage brewing apparatus which is especially adapted for brewing coffee and which is adapted to provide a finished product of better taste characteristics and which further results in economy in reducing the amount of coffee required to brew the finished product.

Yet a further object of the invention is the provision of beverage brewing apparatus which is quite simple and inexpensive in construction and yet which at the same time is quite sturdy and efficient in use.

Other objects and many attendant advantages of the invention will become more apparent when considered in connection with the specification and accompanying drawings, wherein:

FIG. 1 is a front elevation of beverage brewing apparatus according to the present invention;

FIG. 2 is a top view of the structure shown in FIG. 1 partially broken away;

FIG. 4 is a sectional view taken substantially along line 4—4 of FIG. 3 looking in the direction of the arrows;

FIG. 5 is a sectional view taken substantially along line 5—5 of FIG. 3 looking in the direction of the arrows;

FIG. 6 is a sectional view partially broken away similar to the view shown in FIG. 3 but illustrating the components in non-sealing relationship with respect to one another;

FIG. 7 is an exploded view illustrating the manner of assembly of the various components of the apparatus of the present invention;

FIG. 8 illustrates a portion of a modified form of the apparatus according to the present invention; and FIG. 9 is a sectional view taken substantially along line 9—9 of FIG. 8 looking in the direction of the arrows.

Figure 3:
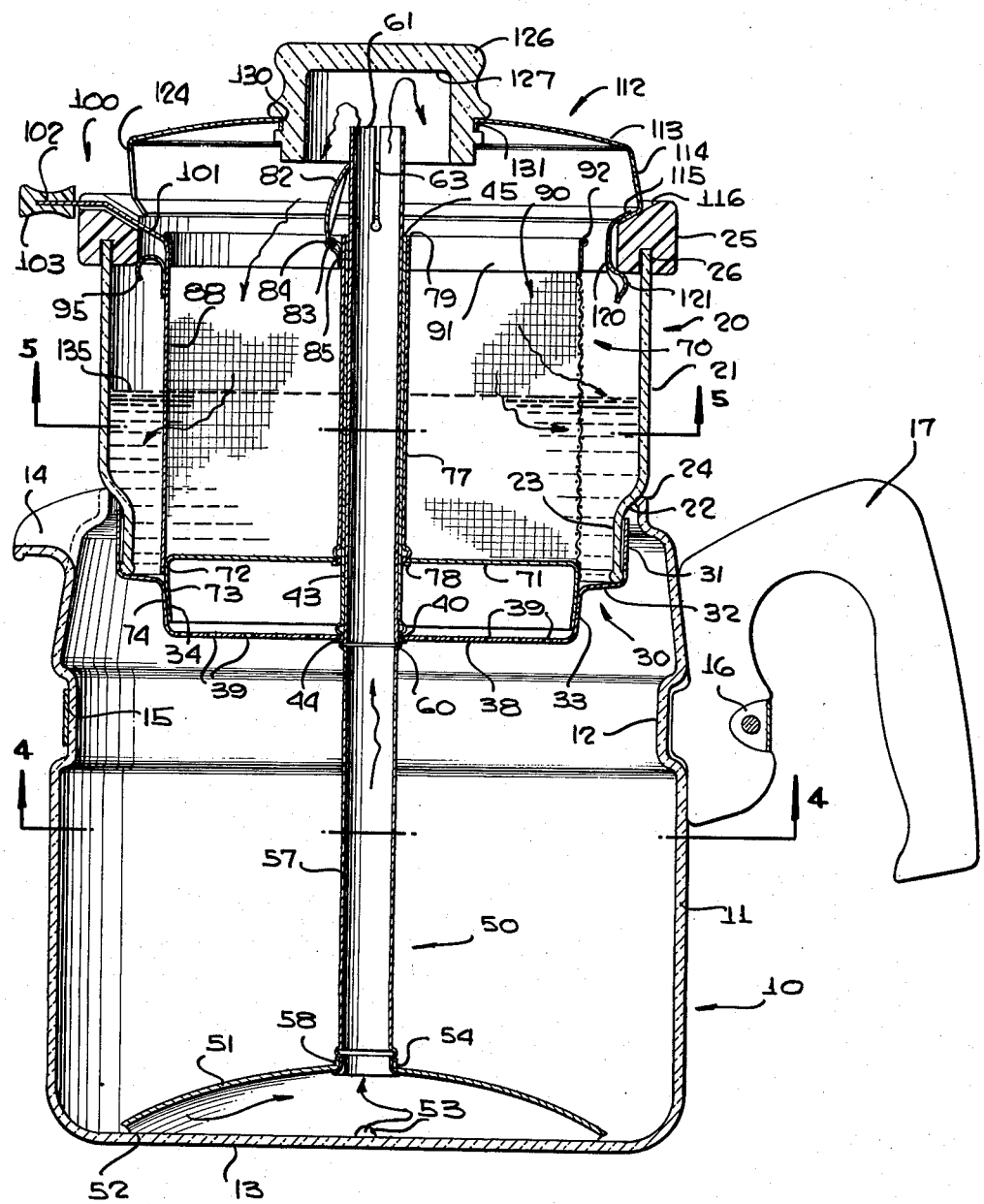
FIG. 3 is a longitudinal section taken substantially along line 3—3 of FIG. 1 looking in the direction of the arrows.

Referring now to the drawings wherein like reference characters designate corresponding parts throughout the several views, a first or lower container is indicated generally by reference numeral 10, this container means including a side wall 11 having a circumferential depression 12 formed therein and a bottom wall 13. This lower container means is formed of a suitable material such as a heat resistant ceramic substance or the like, and the upper portion of the container is open, one portion of the upper edge of the container being formed as indicated by reference numeral 14 to provide a pouring spout. A band 15 is disposed within the circumferentially extending groove or recess 12, the opposite ends of the band having an ear means 16 formed thereon for holding a handle means indicated by reference numeral 17 in operative position for picking up the lower container means 10 and manipulating it into the desired position.

A second or upper container means is indicated generally by reference numeral 20 and includes a side wall portion 21 which may be formed of a suitable material such as glass or other heat-resistant material, the side wall portion tapering inwardly as indicated by reference numeral 22 and finally terminating in a downwardly extending substantially cylindrical portion 23. It will be noted that the inwardly tapering portion 22 of the upper container is adapted to rest upon the upper lip 24 of the lower container.

It will also be noted that when the upper container is disposed in the operative position as shown, a space will be provided through which the liquid can be poured through the pouring spout 14 without removing the upper container from the lower container.

A rim portion 25 is provided at the upper part of the container 20, this rim portion being formed of any suitable heat insulating material such as plastic or the like. Rim portion 25 is provided with a circumferentially extending groove 26 in the lower surface thereof which is adapted to receive the upper edge of the side wall portion 21 which may be cemented in place.

The lower portion of the upper container is indicated generally by reference numeral 30, this lower portion being formed of a suitable substance such as stainless steel or the like which is adapted to provide a smooth sealing surface as hereinafter described. Lower portion 30 includes a substantially cylindrical upwardly directed portion 31 which is cemented or otherwise suitably secured to the outer surface of the lower wall portion 23. Portion 31 of the bottom portion then tapers inwardly as indicated by reference numeral 32 and joins with a downwardly extending portion 33 defining a tapered inwardly facing sealing surface 34 therewithin. The purpose of this sealing surface will hereinafter more fully appear.

Downwardly extending portion 33 in turn merges with the bottom wall 38 of the upper container, this bottom wall having a plurality of openings 39 formed therethrough these openings being of a conventional size so as to permit free flow of liquid therethrough but preventing other particles from escaping downwardly into the lower container. Although it is anticipated that in general no foreign particles will escape from the third container hereinafter described, these perforations 39 are provided as a final filtering arrangement to assure that no undesired foreign matter passes downwardly into the lower container.

The perforated lower wall 38 of the second container is provided with a central opening 40 through which extends a tubular central member 43, the lower end portion 44 of this tubular member being beaded and crimped in position to permanently secure the tubular member to the central portion of the lower wall 38. The open upper end 45 of tubular member 43 terminates at a point slightly below the plane of the upper surface of the rim 25 of the second container.

A pump means indicated generally by reference numeral 50 is provided for supplying liquid from the lower container to the upper container when the device is employed as a percolating type brewing apparatus. Pump means 50 includes a dome-shaped member 51 at the lower end thereof, the lower edge 52 of dome-shaped member 51 resting on the bottom wall 13 of container 10. This lower edge portion is provided with a plurality of cutout portions 53 which provide liquid communication from the lower container into the interior of the dome-shaped portion. Dome portion 51 includes an upwardly extending circular flange 54 defining a central opening which receives the lower end 58 of the tubular portion 57. The lower end 58 is beaded and crimped in operative position as indicated for securely securing the tubular portion 57 to the dome-shaped portion 51.

An intermediate portion of tubular portion 57 is provided with an annular bead 60 upon which the lower end portion 44 of tubular portion 43 is adapted to rest for limting relative movement of the second container with respect to the pump means and for supporting the second container on the pump means for a purpose which will hereinafter appear.

The open upper end portion 61 of tubular portion 57 extends a substantial distance upwardly above the open upper end 45 of the previously described tubular portion. Upper end portion 61 is provided with a plurality of longitudinaly extending slots 63 which may be for example three in number for providing a certain degree of resilience to the upper end of this tubular portion. In addition, this upper end portion 61 is slightly expanded whereby the upper end portion 61 resists withdrawal of the tubular portion 57 of the pump from the central tubular portion 45 of the upper or second container. Accordingly, with this arrangement, when the second container is lifted in an upward direction, the pump will tend to be carried along with the second container, and the pump can only be separated therefrom by exerting additional positive force tending to pull out the central tubular portion 57 of the pump as will be well understood.

As can be seen most clearly in FIGS. 1, 2, 4 and 5, the rim portion 25 of the upper or second container is provided with a pair of integral diametrically opposite outwardly extending manually graspable portions 25' which may have recesses 25" formed in the under surface thereof for receiving a person's fingers. It is apparent that by gripping these portions 25" between the fingers and the thumb, the upper container can be readily lifted and lowered as desired.

As seen most clearly in FIGS. 3 and 7, a third container means is indicated generally by reference numeral 70, this third container means including a solid bottom wall portion 71 which joins with a depending integral skirt portion 72 which in turn joins with a depending portion 73 which has an outer sealing surface 74 thereon, this outer sealing surface 74 being of a complementary taper to the sealing surface 34 formed on the portion 33 of member 30 previously discussed. Member 71 may be formed of a suitable material such as stainless steel similar to the material of portion 30 previously discussed. The sealing surfaces 34 and 74 may preferably be polished at the proper angle so as to ensure a uniform and effective positive seal between these sealing surfaces when in the sealing position shown in FIG. 3. It will be understood that when the members are juxtaposed relative to one another as indicated in FIG.

3, a liquid-tight seal will be provided between the lower portion of the second and third container means.

Container means 70 also includes a central tubular portion 77, the lower end 78 of which extends through a central opening provided in the bottom wall portion of container 70, the lower end portion 78 of the tubular portion being beaded and crimped in place as shown.

The open upper end 79 of tubular portion 77 of the third container 70 extends to a point substantially identical with the upper end portion 45 of the tubular portion of the second container, as may be seen most clearly in FIG. 3. It will be apparent that the tubular portion 77 fits relatively snugly around tubular portion 43 while tubular portion 43 in turn fits rather snugly around the central tubular portion 57 of the pump means.

A dome-shaped cap member 82 is pivotally supported by means of integral ears 84 which are adapted to engage a pin member 83 which is supported by a portion 85 spot-welded or otherwise suitably connected to the outer surface of tubular portion 77. The purpose of the pivotally mounted cap member 82 will hereinafter be more fully explained.

Container means 70 also includes a plurality of spaced upwardly extending support portions 88 which may be for example three in number equally spaced from one another. Support members 88 are of a relatively rigid construction such as stainless steel or the like, the lower ends of these support members being welded or otherwise suitably secured to the outer surface of wall portion 72 of the bottom portion of the container. These three spaced support members 88 are adapted to hold in operative position the side wall portion indicated by reference numeral 90 of container 70.

The side wall portion 90 of container 70 is perforated and is designed to provide a plurality of small openings which permit ready flow of liquid therethrough but which are of a sufficient size so as to prevent fine coffee grounds and the like from passing therethrough. As disclosed, the side wall portion 90 comprises a fine wire cloth, the cloth being of approximately 200 mesh. This wire cloth may be suitably secured in place as by soldering, welding or crimping in place, the side wall portion of course being secured to the lower portion of the framework defined by bottom wall portion 71 and the upper portion of the framework including the three spaced support members 88.

As illustrated, the upper end portion of the wire cloth is doubled back as indicated at 91 to provide a bead 92 at the upper end for strengthening this portion of the side wall portion.

Means is provided for centering and urging the third container 70 in a downward direction and retaining it in such position so as to ensure an effective fluid tight seal between the second and third containers, this means in the present modification taking the form of a plurality of spaced spring members 95 shown as being three in number equally spaced from one another and being secured in operative position as by spot-welding and the like to the outer surfaces of support members 88. As seen particularly in FIG. 3, each of these spring members 95 is adapted to engage an inner lower edge portion of the rim 25 so as to effectively exert a force on the container 70 maintaining it in the sealed position as shown in this figure.

As seen at the upper lefthand portion of FIG. 3, an operating means indicated generally by reference numeral 100 is associated with the third container 70 and may include an upwardly outwardly extending portion 101 which may be integral with one of the members 88, member 101 in turn joining with an integral outwardly extending portion 102. At the outer end of portion 102 is mounted a finger grip portion 103 which may be formed of any suitable heat-resistant substance such as plastic or the like.

Referring now particularly to FIG. 1, rim 25 of the second or upper container 20 is provided with a depression defined by a lower wall portion 105 which is joined by sloping cam surfaces 106 and 107 with the upper surface 108 of the rim. As shown in FIGS. 1 and 2, the portion 102 of the operating means is illustrated as resting in the central portion of this recess adjacent the lower wall portion 105 thereof. A slight clearance may be provided between the under surface of portion 102 and bottom wall portion 105 to ensure that the sealing surfaces 34 and 74 will be in positive sealing contact with one another when the operating means is in such central position.

When it is desired to release the liquid which may be trapped in the upper container 20 due to the sealing contact between the second and third containers 20 and 70 the operating means 100 may be operated either to the right or left so as to move the portion 102 thereof into contact with either the cam surface 106 or 107. Upon further relative movement of the operating means with respect to the rim of the second container, it is apparent that the cam surfaces will urge the operating means in an upward direction until it rides upon the upper surface 108 of the rim. This slight upward movement of the operating means will, of course, carry the second container means upwardly a corresponding distance thereby spacing the sealing surfaces 34 and 74 from one another such that liquid may flow downwardly between the spaced sealing surfaces and thence through the openings 39 in the lower wall of the second container and downwardly into the first container. Of course, when it is desired to again close the second and third container sealing means, the operating means is again moved so that it is positioned in the central portion of the depression in the rim 25 so as to thereby allow the sealing surfaces to again come into sealing contact with one another under the influence of the spring means 95 whereupon a liquid seal will again be provided.

A top closure means for the apparatus is indicated generally by reference numeral 112, the top closure means including a main body portion 113 which defines a substantially dome-shaped upper configuration and which includes a downwardly and outwardly flaring portion 114 which in turn is joined with an inwardly extending and tapering portion 115 which is adapted to fit snugly on a correspondingly downwardly tapered surface 116 formed at the upper inner portion of rim 25.

Spring means is provided for holding the top closure means in operative position as shown in FIG. 3, the spring means taking the form of a plurality of spring members 120 which may for example be two in number, each of these spring members including an inwardly extending portion 121 at the lower end thereof which is adapted to engage the lower inner surface of the rim means 25. It is evident that spring means 120 will serve to retain the top closure means in operative position until it is desired to remove it.

A cutout portion 124 is formed through wall portions 114 and 115 of the main body portion 113, this cutout portion 124 being disposed in that area of the top closure means adjacent to the operating means 100 whereby the operating means may be freely moved from its sealing position to the unsealing position in either direction as will be most clearly understood from an inspection of FIG. 1 for example.

The top closure means 112 also includes a central portion 126 which may be formed of a suitable transparent material such as glass or plastic and the like, member 126 having a central recess 127 formed in the lower surface thereof which is adapted to receive the open upper end 61 of the pump. Member 126 is designed to be employed as a knob member for lifting the top closure means as is conventional, member 126 being provided with an annular groove 130 which receives a central flange portion 131 of body means 113, whereby member 126 is rigidly attached to body portion 113.

Operation

The apparatus as illustrated in FIG. 3 is shown in operative position for brewing coffee according to the common percolating operation. As is well known, in this type of operation, the liquid heated in the lower container which is generally water is pumped upwardly through the tubular portion 57 of the pump and thence perks into the transparent portion 126 of the top closure member. The heated water then drops downwardly into the interior of the third container means 70 of the present invention. At this point the operation differs from the conventional percolator which allows the water to immediately drain back down through the coffee grounds to the lower container. In the present invention, the water as its drops down into the interior of container 70 will then pass outwardly through the perforated wall portion 90 of the container 70 and be trapped in the space illustrated between the second and third container as well as filling the space of the interior of the third container. In a typical example, the water may be perked up from the lower container until all the water is exhausted from the lower container at which time the water in the upper portion of the apparatus will assume the level as indicated by reference numeral 135. It will be understood that the coffee grounds are disposed within and held within the interior of the third container 70, and accordingly, the liquid as illustrated in FIG. 3 will steep the coffee grounds and retain the liquid in this position so as to steep for any desired period of time.

When the desired steeping time has been accomplished, the operating means will be operated as previously described to move the components into the open position as indicated in FIG. 6. As illustrated by the arrows in this figure, the liquid can then flow downwardly through the space between the two sealing surfaces and thence through the openings 39 in the perforated bottom of the second container and back into the first container. After the liquid has flowed downwardly into the first container, the liquid contents can then be poured out into suitable receptacles.

In pouring out the liquid from the first container, the liquid will flow through the pouring spout 14 and if it is desired to retain the upper containers in operative position, they may be held in such position by grasping the knob 126, and it will be further apparent that the liquid stream flowing through the pouring spout will have no opportunity for entraining any coffee grounds in the stream of liquid.

If it should be desired to remove the upper container means from the lower container prior to pouring out the brewed beverage therefrom, the handle portions 25' of the rim 25 may be grasped so as to lift the second container upwardly and away from the first container. Such upward movement will of course carry the third container means 70 therealong, and furthermore, the pump will be carried upwardly since the resilient expanded upper end portion 61 thereof will prevent withdrawal of the pump from the central tubular portion of the second container. Of course, if it is then desired to remove the pump from the second container, the pump can be forcibly removed.

In assembling the second and third containers as well as the pump means with respect to one another, it will be understood that a number of variations may be employed. When the pump is disassembled from the two upper containers 20 and 70, the cap means 82 will cover the open upper end of the tubular portion of the third container 70. In this position, coffee grounds, tea leaves, or any other substance may be readily poured into the third container without the possibility of such material passing downwardly through the central tubular portion thereof. The coffee grounds or other substance may be placed in the third container 70 when it is disassembled from the second container 20 or when it is disposed in operative position therewithin as desired.

In any event, the material will normally be placed within the third container 70 when the pump means is not disposed in operative position relative thereto as shown in FIG. 3.

After having disposed the coffee grounds or other material within container 70 and with container 70 and container 20 in operative sealed position as shown in FIG. 3, if it is desired to operate the device as a percolating style brewing apparatus, the pump means can then be inserted in a position as shown in FIG. 3 relative to the second and third containers whereupon the entire assembly may be lifted by the handle portions 25' and lowered into the first container into the position shown in FIG. 3.

The device is then adapted to operate as a percolating arrangement. It will further be understood that if by some chance it should be desired to operate the device as a conventional percolator wherein the water passes through the coffee grounds and thence directly back to container 10, the third container 70 may be first moved to its open unsealed position by operating the operating means 100 as will be well understood.

When it is desired to employ the device as a drip type coffee brewer, or for that matter if the device is to be utilized for making tea, the second and third containers 20 and 70 may be assembled in the sealed position as shown in FIG. 3, but with the pump means removed from the central tubular portion of the second container. In this position, the cover 82 will serve to cover the open upper ends of the tubular portions of the second and third containers. The coffee grounds or tea leaves may then be placed within the interior of container 70.

After the above steps have been taken, the liquid may then be poured into the open upper end of the second container with the covering closure means 112 removed. This liquid may be poured into the position either before or after the second and third containers have been disposed in overlying relationship to the lower container since the sealing means provides an effective seal.

After having poured in the liquid, the coffee grounds or tea leaves may be allowed to steep for the desired period of time whereupon the members are assembled so that the second container 20 is supported over the open upper end of the first container 10, whereupon the third container 70 may be moved to its released or unsealed position so that the liquid can flow downwardly through the perforated bottom 38 of the second container into the lowermost container 10.

After the liquid or brewed beverage has been allowed to drain downwardly into the lower container 10, the upper assembly may be removed and the lower assembly employed as a pot from which the beverage may be dispensed.

Referring now to FIGS. 8 and 9 of the drawings, a modification is illustrated wherein the spring means 95 for urging the second and third containers into sealing engagement with one another have been eliminated and a modified form of construction is utilized for accomplishing this end result. In the modification shown in FIGS. 8 and 9, the same parts which are identical with those previously described in connection with the other figures have been given the same reference numerals primed.

The lower wall portion 38' as seen in FIG. 8 corresponds to the lower wall 38 as seen in FIG. 3, and tubular portion 140 corresponds to the tubular portion 43 previously described. The lower portion 141 of tubular portion 140 is beaded and crimped in operative position as previously described, tubular portion 140 being modified as seen most clearly in FIG. 9 so as to provide a pair of outwardly extending embossments 142.

Tubular portion 145 replaces the tubular portion 77 as shown in FIG. 3, tubular portion 145 being provided with a pair of beads 146 and 147 which retain this tubular portion in operative position relative to the lower wall portion 71' of the third container. The lowermost portion 148 of tubular portion 145 is provided with a pair of diametrically opposite cam lock grooves 149 each of which includes a vertically extending portion 150 which joins with a circumferentially extending portion 152 which extends obliquely upwardly from the vertical portion 150.

When it is desired to assemble the third container as shown in FIGS. 8 and 9 with respect to the second container, it is apparent that the two embossments 142 will fit within the vertical portions of the cam grooves 150, and the embossments will move upwardly until they can move laterally into the portions 152 of the grooves. Upon relative rotation of the third container with respect to the second container, it is apparent that the embossments will move upwardly into the obliquely extending portions 152 of the groove so as to thereby pull the third container downwardly into sealing engagement with the second container to ensure that an effective fluid-tight seal will be provided. It is also apparent that when it is desired to move the members to the unsealed position relative rotation in the opposite direction will cause camming of the third container away from the second container to break the sealing contact between the sealing surfaces and permit flow of liquid downwardly into the lowermost container.

It is apparent from the foregoing that the present invention provides a new and novel brewing apparatus which may be employed for all conventional types of brewing operations such as drip or percolator type brewing of coffee or conventional brewing of tea, this single apparatus allowing many different modes of use so as to accomplish any one of many different types of brewing operations. It is apparent that the lower container of the apparatus may be utilized as a server or teapot and provides a very neat and attractive appearance when so utilized. All the various components which need be at any time manually grasped are provided with heat insulated portions to eliminate the possibility of burning one's hands.

The contents of the lowermost container means can be readily poured therefrom without removing the upper containers if so desired, and the apparatus may be used equally well for brewing coffee, tea, or any other types of beverages, particularly where it is desirable to allow a steeping action to take place. Means is provided for controlling the flow of liquid from the upper or second container down into the lowermost container to thereby control the amount of steeping action which takes place, and further means is provided for ensuring sealing of the second and third containers with respect to one another. In one modification this takes the form of spring means, and in another modification, a camming arrangement is employed.

The apparatus of the present invention may be utilized for brewing coffee, either by the percolating method or the drip method, and the fine mesh perforated wall portion of the third container 70 is such that it is adapted to freely pass liquid therethrough yet retain the finest grounds of material which may be disposed therewithin. The present invention also affords the advantage of saving in the amount of coffee or tea leaves which may be required for brewing the apparatus and provides a better taste.

The device is quite simple and inexpensive in construction, and yet is quite sturdy and efficient in use.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. Beverage brewing apparatus comprising a first container means, second container means supported at the upper portion of said first container means, the lower portion of said second container means including at least one opening providing a liquid flow path between said second container means and said first container means, and retainer means positioned entirely within said second container means for supporting and retaining coffee grounds and the like in operative position within said second container means, said retainer means having a closed lower wall portion and a perforated outer wall portion spaced from the inner wall portion of said second container means to provide a space therebetween for receiving liquid, means for permitting flow of liquid between the outer surface of said retainer means and the inner surface of said second container means into the lower portion of said second container means, and means for selectively providing a liquid tight seal between the lower portions of the inner surface of said second container means and the outer surface of said retainer means positioned within said second container means for preventing liquid from passing into the lower portion of said second container means and thence through said opening thereby retaining liquid in the upper portion of said second container means and preventing flow into said first container means.

2. Beverage brewing apparatus comprising a first container means, second container means supported at the upper wall of said first container means and including a perforated lower portion, said second container means including an inner sealing surface at the lower portion thereof, a third container means positioned entirely within said second container means, said third container means having a closed lower wall and including a perforated outer wall portion for permitting liquid flow therethrough but preventing movement therethrough of coffee grounds and the like, said outer wall portion being spaced from the inner wall portion of said second container means to provide a space therebetween for receiving liquid, said third container means including an outer sealing surface at the lower portion thereof for engaging said inner sealing surface to provide a liquid seal between said second and third container means to prevent liquid flow into the lower portion of said second container means and through the perforated lower portion of said second container means into said first container means and operating means extending outwardly of said second container means for moving said third container means relative to said second container means to disengage said sealing surfaces and permit liquid flow therebetween.

3. Apparatus as defined in claim 2, wherein each of said sealing surfaces is tapered complementary to one another to ensure a positive liquid seal therebetween.

4. Beverage brewing apparatus comprising a first container means having an open upper end portion, a second container means supported at the upper portion of said first container means and having a perforated bottom portion, said second container means including an inwardly facing tapered sealing surface at the lower portion thereof, third container means adapted to be positioned within said second container means, said third container means including a solid bottom wall having an outwardly directed sealing surface thereon and depending therefrom for engaging said inwardly directed sealing surface to provide a liquid seal between the lower portions of said second and third container means to prevent liquid flow into the lower portion of said second container means and through the perforated bottom portion of said second container means into said first container means, said third container means including an open upper end and a outer side wall portion, said side wall portion having a plurality of small openings formed therethrough of such a dimension as to permit liquid flow therethrough but preventing the movement of coffee grounds and the like therethrough, said outer wall portion being spaced from the inner wall portion of said second container means to provide a space therebetween for receiving liquid, and operating means extending outwardly of said second container means for moving said third container means relative to said second container means to disengage said sealing surfaces and permit liquid flow therebetween.

5. Apparatus as defined in claim 4, wherein said operating means is connected to said third container means and extends outwardly of said second container means for moving said third container means out of sealing contact with said second container means to permit downward flow of liquid from said second container means through the perforated bottom portion thereof into said first container means.

6. Apparatus as defined in claim 5, wherein said second container means includes cam means formed thereon, said operating means engaging said cam means upon relative movement of said operating means with respect to said second container means to move said third container means out of sealing engagement with said second container means.

7. Apparatus as defined in claim 6, including a top closure for said second container means, means for positively securing said top closure in position on said second container means, said top closure including a cutout portion for permitting ready relative movement of said operating means with respect to said second container means.

8. Beverage brewing apparatus comprising a first container means having an open upper end portion, second container means supported at the upper portion of said first container means and having a perforated bottom portion, said second container means including a tubular portion extending upwardly from the central bottom portion thereof and sealed with respect thereto, third container means for positioning within said second container means, said third container means having a closed bottom portion and a perforated outer wall portion for permitting liquid flow therethrough but preventing coffee grounds and the like from passing therethrough, said outer wall portion being spaced from the inner wall portion of said second container means to provide a space therebetween for receiving liquid, means for providing a seal between the lower portions of said second and third container means for preventing liquid flow into the lower portion of said second container means and from said second container means downwardly into said first container means through the perforated bottom portion thereof, said third container means including a tubular portion extending upwardly from the central bottom portion thereof and sealed with respect thereto, said last-mentioned tubular portion being disposed in surrounding relationship to the tubular portion of said second container means and operating means extending outwardly of said second container means for moving said third container means relative to said second container means to disengage said sealing means and permit liquid flow therebetween.

9. Apparatus as defined in claim 8, including means disposed within said first container means for supplying liquid from said first container means to said second container means, said means for supplying liquid including a separate upwardly extending tubular portion which is slidably disposed within the tubular portion of said second container means and extends upwardly beyond the upper end portions of the tubular portions of said second container means and said third container means.

10. Apparatus as defined in claim 9, including movable means supported by the tubular portion of said third container means for covering the upper ends of the tubular portions of said second and third container means and being adapted to be engaged by the upper end of the tubular portion of said means for supplying liquid from said first to said second container means.

11. Apparatus as defined in claim 10, wherein the upper end portion of said last-mentioned tubular means is of a resilient construction and is slightly expanded in its normal position so as to resist removal from the tubular means of said second container means.

12. Beverage brewing apparatus comprising a first container means having an open upper end portion, second container means supported at the upper end portion of said first container means and having a perforated lower portion, said second container means including an inwardly directed tapered sealing surface at the lower portion thereof, third container means disposed within said second container means, said third container means including a substantially solid bottom portion and including an outwardly directed tapered sealing surface extending downwardly from said bottom portion and adapted to engage said aforementioned tapered sealing surface to provide a liquid seal between the lower portions of said second and third container means to prevent liquid flow downwardly into the lower portion of said second container means and through the perforated lower portion of said second container means, said third container means including a perforated outer side wall portion for permitting liquid flow therethrough, but preventing flow of coffee grounds or the like therethrough, said outer wall portion being spaced from the inner wall portion of said second container means to provide a space therebetween for receiving liquid, operating means connected to said third container means and extending outwardly of said second container means for permitting movement of said third container means with respect to said second container means to disengage said sealing surfaces and to permit liquid flow into the lower portion of said second container means and from said second container means downwardly into said first container means, said second container means including a tubular portion extending upwardly from the bottom central portion thereof and sealed with respect thereto, said third container means including a tubular portion extending upwardly from the bottom central portion thereof and sealed with respect thereto and being disposed in surrounding relationship to said aforementioned tubular portion, means for supplying liquid from said first to said second container means and including a separate upwardly extending tubular portion which is slidably received in the tubular portion of said second container means and which extends upwardly above the upper ends of the tubular portions on said second and third container means, and top closure means supported by the upper portion of said second container means and being disposed in overlying relationship to the upper end portion and spaced from the upper end portion of the tubular portion of said means for supplying liquid from said first to said second container means.

13. Apparatus as defined in claim 12, wherein said second container means includes cam means formed thereon for engaging said operating means to cam said third container means out of sealing engagement with said second container means.

14. Apparatus as defined in claim 12, including movable means supported by said tubular portion of said third container means and adapted to overlie the open upper ends of the tubular portions of said second and third container means, and being adapted to be moved out of overlying relationship upon engagement with the upper end portion of the tubular portion of said means for supplying liquid from said first to said second container means.

15. Apparatus as defined in claim 12, wherein the upper end portion of said tubular portion of the means for supplying liquid from said first to said second container means is split longitudinally thereof and slightly expanded so as to resist withdrawing movement through the tubular portion of said second container means.

16. Apparatus as defined in claim 12, including resilient means for normally urging said sealing surfaces in operative sealing engagement with one another.

17. Apparatus as defined in claim 12, including cooperating means formed on the tubular portion of said second container means and the tubular portion of said third container means to retain said sealing surfaces in engagement, one of said last-mentioned tubular portions having projection means extending therefrom, and the other of said tubular portions has slot means formed therein for receiving said projection means.

18. Beverage brewing apparatus comprising a first container means having an open upper end portion and handle means connected therewith, second container means supported at the upper portion of said first container means, said second container means having a perforated lower wall portion and having an open upper end portion, said second container means having formed on the lower outer portion thereof a tapered sealing surface, cam surface means formed on the upper portion of said second container means, said second container means including a tubular portion centrally located therewithin and extending upwardly from the lower portion thereof to a point adjacent the plane of the upper open end thereof, said tubular portion being open at the upper and lower ends thereof, third container means positioned entirely within said second container means, said third container means having a substantially solid bottom portion having formed on the outer surface thereof a tapered sealing surface engaging said aforementioned tapered sealing surface to provide a liquid seal between said second and third container means and to prevent liquid from flowing downwardly into the lower portion of said second container means and from said second container means into said first container means, said third container means having an outer side wall portion having a plurality of small openings formed therethrough adapted to permit liquid to flow freely therethrough but preventing movement of coffee grounds or the like therethrough, said outer wall portion being spaced from the inner wall portion of said second container means to provide a space therebetween for receiving liquid, means for holding said second container means and third container means in operative sealed relationship with respect to one another, operating means connected to said third container means and extending outwardly of said second container means for moving said third cotainer means out of sealing engagement with said first container means, said operating means being adapted to engage said cam surface means when moving the third container means to its unsealed position with respect to said second container means, said third container means including a centrally located tubular portion extending upwardly from the bottom portion thereof and being disposed in surrounding relationship to said tubular portion of said second container means, said tubular means of said third container means extending upwardly to a point substantially coextensive with the upward extent of said tubular means of said second container means, a cap pivotally supported by said tubular means of the third container means and being adapted to normally lie in overlying relationship to the open upper ends of the tubular means associated with both said second and third container means, separate pump means for supplying liquid from said first container means to said second container means, said pump means including a dome portion at the lower end thereof adapted to rest upon the bottom of said first container means, said pump means including a tubular portion extending upwardly from said dome portion and being slidably positioned within the tubular portion of said second container means, the upper end portion of the tubular portion of said pump means extending above the open upper ends of the tubular portions of said second and third container means and being split longitudinally thereof and slightly expanded so that when said second container means is lifted off of said first container means, said pump means will be lifted along with said second container means, and a top closure means supported at the open upper end of said second container means, means for retaining said top closure means in operative position, said top closure means including a portion disposed in spaced overlying relationship to the open upper end of the tubular portion of said pump means, said top closure means also including a cutout portion for permitting relative movement of said operating means connected with said third container means with respect to said second container means.

References Cited by the Examiner
UNITED STATES PATENTS

| | | | |
|---|---|---|---|
| 169,626 | 11/75 | Crowell | 99—305 |
| 246,785 | 9/81 | Kappner | 99—299 |
| 313,469 | 3/85 | Byler | 99—313 X |
| 394,046 | 12/88 | Wilson | 99—299 |
| 1,188,249 | 6/16 | Cook | 99—313 X |
| 1,195,487 | 8/16 | Maignen | 99—299 |
| 1,306,688 | 6/19 | Downham | 99—310 X |
| 1,943,386 | 1/34 | Johnson | 99—313 X |
| 2,899,887 | 8/59 | Berry et al. | 99—310 |

FOREIGN PATENTS

| | | |
|---|---|---|
| 59,608 | 2/54 | France. |
| 919,345 | 11/46 | France. |
| 649,734 | 9/37 | Germany. |

WILLIAM B. PENN, *Primary Examiner.*

JEROME SCHNALL, *Examiners.*